(12) United States Patent
Murozumi

(10) Patent No.: US 8,084,381 B2
(45) Date of Patent: Dec. 27, 2011

(54) GLASS

(75) Inventor: Hisashi Murozumi, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 358 days.

(21) Appl. No.: 12/107,313

(22) Filed: Apr. 22, 2008

(65) Prior Publication Data

US 2008/0269037 A1    Oct. 30, 2008

(30) Foreign Application Priority Data

Apr. 27, 2007   (JP) ................. 2007-119395

(51) Int. Cl.
*C03C 3/093*   (2006.01)
*C03C 3/091*   (2006.01)

(52) U.S. Cl. .................................. 501/67; 501/66

(58) Field of Classification Search ............. 501/66, 501/67
See application file for complete search history.

(56) References Cited

U.S. PATENT DOCUMENTS

| | | | | |
|---|---|---|---|---|
| 4,824,806 | A * | 4/1989 | Yokoi et al. ................ 501/35 |
| 5,348,916 | A * | 9/1994 | Kushitani et al. .......... 501/66 |
| 5,770,535 | A * | 6/1998 | Brix et al. .................. 501/67 |
| 5,885,914 | A * | 3/1999 | Nishizawa et al. ......... 501/66 |
| 5,908,703 | A * | 6/1999 | Brix et al. .................. 428/426 |
| 6,060,168 | A * | 5/2000 | Kohli ......................... 428/428 |
| 6,671,026 | B2 * | 12/2003 | Peuchert et al. ............. 349/158 |
| 6,858,552 | B2 * | 2/2005 | Peuchert ..................... 501/66 |
| 6,881,692 | B2 * | 4/2005 | Murata et al. ............... 501/66 |
| 7,358,205 | B2 * | 4/2008 | Narita et al. ................ 501/66 |
| 2004/0127342 | A1 * | 7/2004 | Liang et al. ................ 501/66 |
| 2004/0209758 | A1 * | 10/2004 | Peuchert et al. ............. 501/66 |
| 2004/0220039 | A1 * | 11/2004 | Peuchert ..................... 501/66 |
| 2009/0226671 | A1 * | 9/2009 | Yanase et al. ................ 428/156 |

FOREIGN PATENT DOCUMENTS

| | | |
|---|---|---|
| JP | 60-141642 A | 7/1985 |
| JP | 62-226839 A | 10/1987 |
| JP | 02-030641 A | 2/1990 |
| JP | 06-219780 A | 8/1994 |
| JP | 2001-261366 A | 9/2001 |

* cited by examiner

*Primary Examiner* — Karl Group
*Assistant Examiner* — Elizabeth A Bolden
(74) *Attorney, Agent, or Firm* — Westerman, Hattori, Daniels & Adrian, LLP

(57) ABSTRACT

The present invention is to provide glass exhibiting both of a low thermal expansion and a low-temperature melting property and to provide glass which is able to be manufactured under the condition where an average linear thermal expantion coefficient at 0° C. to 50° C. is preferably not more than $40 \times 10^{-7}$ °C.$^{-1}$, more preferably $35 \times 10^{-7}$ °C.$^{-1}$ and, most preferably, $33 \times 10^{-7}$ °C.$^{-1}$ and a fusing temperature is preferably not higher than 1550° C., more preferably not higher than 1540° C. and, most preferably, not higher than 1530° C. The means therefor is the glass, characterized in that, where an average linear thermal expantion coefficient at 0° C. to 50° C. is not more than $40 \times 10^{-7}$ °C.$^{-1}$, an $Al_2O_3$ component and a $B_2O_3$ component on the basis of oxides are contained and the ratio of $B_2O_3/Al_2O_3$ in terms of % by mass is not less than 0.8.

4 Claims, No Drawings

GLASS

CROSS REFERENCES TO RELATED APPLICATIONS

The present invention contains subject matter related to Japanese Patent Application No. 2007/119,395 filed with the Japan Patent Office on Apr. 27, 2007, the entire contents of which being incorporated herein by reference.

BACKGROUND OF THE INVENTION

1. Field of the Invention

The present invention relates to glass having a low thermal expansion useful as heat-resisting glass and various substrate materials and also to a method of manufacturing the same.

2. Background of the Invention

Glass having a low thermal expansion has been used in wide areas including the field of substrate material, heat resisting glass, etc. in precision machines and instruments and also in the field of substrate material for display in case it is without alkali.

A commonly known glass having low thermal expansion is a borosilicate glass. As to the representative one thereof, #7740 manufactured by Corning has been known and its average linear thermal expansion coefficient is $32.5 \times 10^{-7\circ}$ $C.^{-1}$ at 0 to 300° C.

However, in the glass having such a low thermal expansion, melting temperature of the glass material for the manufacture of glass is usually very high.

Therefore, in the manufacture of such a glass, there have been problems such as that working ability lowers, cost for the manufacturing equipments becomes high and cost for maintenance of the manufacturing equipments becomes high.

When melting property of glass is improved for solving such problems, an average linear thermal expansion coefficient tends to become high. In the properties of glass, low thermal expansion and low-temperature melting are usually in a conflicting relation each other and development of glass exhibiting both of the two characteristics has been difficult.

On the other hand, glass having a low thermal expansion has been demanded in broad fields and, therefore, there has been a demand for glass which has both of low thermal expansion and low-temperature melting property and is able to manufacture at a low cost.

As a glass for a liquid crystal display, Patent Document 1 discloses a glass where an average linear thermal expansion coefficient at 30° C. to 380° C. is 33 to 49 ($\times 10^{-7\circ}$ $C.^{-1}$) and temperature corresponding to viscosity of $10^{2.5}$ poises which is a high-temperature viscosity of glass is 1499° C. to 1595° C. However, in its Examples where an average linear thermal expansion coefficient is relatively low, the above temperature is high and there is no disclosure for Example of glass having both low thermal expansion and low-temperature melting property.

Patent Document: Gazette of Japanese Patent Laid-Open No. 2001/261,366

SUMMARY OF THE INVENTION

An object of the present invention is to provide a glass having a low thermal expansion and a low-temperature melting property and is to provide a glass where an average linear thermal expansion coefficient at 0° C. to 50° C. is not more than $40 \times 10^{-7\circ}$ $C.^{-1}$, preferably less than $35 \times 10^{-7\circ}$ $C.^{-1}$ and, most preferably, less than $33 \times 10^{-7\circ}$ $C.^{-1}$ and the characteristic to be further demanded is that it is able to be manufactured when a melting temperature is preferably not higher than 1550° C., more preferably not higher than 1540° C. and, most preferably, not higher than 1530° C.

Incidentally, a melting temperature of a glass material (it may also be just referred to melting temperature) is an index for a low-temperature melting property and is a temperature when a viscosity becomes $10^{2.5}$ dPa·s upon heating the material to give a fused liquid. It is able to be measured using a viscometer of a ball-pulling-up type and, for example, using BVM-13LH manufactured by Yugen Kaisha Opto Kigyo.

Further, an average linear thermal expansion coefficient is an index for a low thermal expansion and is a value measured according to "Measuring Method for Average Linear Thermal Expansion Coefficient of Optical Glass at Normal Temperature" (JOGIS (Japan Optical Glass Industry Standards) 16-2003) where the temperature range is changed to a range of 0° C. to 50° C.

In order to solve the above problems, the present inventor has found that, in the glass which is characterized in containing an $Al_2O_3$ component and a $B_2O_3$ component on the basis of oxides where the ratio of $B_2O_3/Al_2O_3$ in terms of % by mass is not less than 0.8, an average linear thermal expansion coefficient at 0° C. to 50° C. is not more than $40 \times 10^{-7\circ}$ $C.^{-1}$, more preferably not more than $35 \times 10^{-7\circ}$ $C.^{-1}$ and, most preferably, not more than $33 \times 10^{-7\circ}$ $C.^{-1}$. Further, said glass contains abundant ones which are able to be manufactured when a melting temperature of a glass material is preferably not higher than 1550° C., more preferably not higher than 1540° C. and, most preferably, not higher than 1530° C. To be more specific, the present invention provides the followings.

(Constitution 1)

Glass, characterized in that, where an average linear thermal expansion coefficient at 0° C. to 5° C. is not more than $40 \times 10^{-7\circ}$ $C.^{-1}$, an $Al_2O_3$ component and a $B_2O_3$ component on the basis of oxides are contained and the ratio of $B_2O_3/Al_2O_3$ in terms of % by mass is not less than 0.8.

(Constitution 2)

The glass according to Constitution 1, wherein it contains an $SiO_2$ component on the basis of an oxide and the ratio of $SiO_2/Al_2O_3$ in terms of % by mass is not more than 3.2.

(Constitution 3)

The glass according to Constitution 1 or 2, wherein it contains the following components in terms of % by mass on the basis of oxides.

40 to 64% of $SiO_2$ and
10 to 30% of $B_2O_3$ and
12.5 to 25% of $Al_2O_3$ and
0 to 10% of ZnO.

(Constitution 4)

The glass according to Constitution 3, wherein it contains 1 to 10% of a ZnO component in terms of % by mass on the basis of an oxide.

(Constitution 5)

The glass according to Constitution 3 or 4, wherein it contains the following components in terms of % by mass on the basis of oxides.

0 to 10% of $TiO_2$ and/or
0 to 10% of CaO and/or
0 to 10% of BaO and/or
0 to 3% of $As_2O_3$.

(Constitution 6)

The glass according to any of Constitutions 2 to 5, wherein any of the components other than a $SiO_2$ component, an $Al_2O_3$ component and a $B_2O_3$ contained in glass is not more than 15% in terms of % by mass on the basis of oxides.

(Constitution 7)
The glass according to any of Constitutions 1 to 6, wherein it contains no alkali metal oxide component.
(Constitution 8)
The glass according to any of Constitutions 1 to 7, wherein a melting temperature of a glass material is not higher than 1,550° C.
(Constitution 9)
In a method for the manufacture of glass where a glass material which gives the glass after melting contains an $Al_2O_3$ component and a $B_2O_3$ component on the basis of oxides and the ratio of $B_2O_3/Al_2O_3$ is not less than 0.8 is manufactured by a melting method, a method for the manufacture of the glass which is characterized in that a melting temperature of said glass material is not higher than 1550° C.
(Constitution 10)
The method for the manufacture of glass according to Constitution 9, wherein the glass material after the melting gives the glass where it contains an $SiO_2$ component on the basis of oxides and the ratio of $SiO_2/Al_2O_3$ in terms of % by mass is not more than 3.2.
(Constitution 11)
The method for the manufacture of glass according to Constitution 10, wherein the glass material is a glass material which gives a glass after the melting containing the following components in terms of % by mass on the basis of oxides.
40 to 64% of $SiO_2$ and
10 to 30% of $B_2O_3$ and
12.5 to 25% of $Al_2O_3$ and
0 to 10% of ZnO.
(Constitution 12)
The method for the manufacture of glass according to Constitution 11, wherein the glass material is a glass material which gives a glass after the melting containing 1 to 10% of a ZnO component in terms of % by mass on the basis of an oxide.
(Constitution 13)
The method for the manufacture of glass according to Constitution 11 or 12, wherein the glass material is a glass material which gives a glass after the melting containing the following components in terms of % by mass on the basis of oxides.
0 to 10% of $TiO_2$ and/or
0 to 10% of CaO and/or
0 to 10% of BaO and/or
0 to 3% of $As_2O_3$.
(Constitution 14)
The method for the manufacture of glass according to any of Constitutions 10 to 13, wherein the glass material is a glass material where any of the components other than a $SiO_2$ component, an $Al_2O_3$ component and a $B_2O_3$ contained in the glass after melting is not more than 15% in terms of % by mass on the basis of oxides.
(Constitution 15)
The method for the manufacture of glass according to any of Constitutions 10 to 14, wherein the glass material is a glass material where none of alkali metal component is contained in the glass after melting.
(Constitution 16)
A substrate material using the glass mentioned in any of Constitutions 1 to 8.
(Constitution 17)
A structure material using the glass mentioned in any of Constitutions 1 to 8.
(Constitution 18)
A material of a transmission optical system using the glass mentioned in any of Constitutions 1 to 8.

In the present invention, composition of the components is expressed in terms of % by mass and, therefore, the corresponding molar % is unable to be expressed straightforwardly although it may be roughly expressed as follows for achieving the same effect in the above constitutions.
(Constitution 19)
The glass according to Constitution 1 or 2, wherein it contains the following components in terms of molar % on the basis of oxides.
45 to 72% of $SiO_2$ and
10 to 32% of $B_2O_3$ and
7 to 20% of $Al_2O_3$ and
0 to 10% of ZnO.
(Constitution 20)
The glass according to Constitution 19, wherein it contains 3 to 10% of ZnO in terms of molar % on the basis of an oxide.
(Constitution 21)
The glass according to Constitution 19 or 20, wherein it contains the following components in terms of molar % on the basis of oxides.
0 to 10% of $TiO_2$ and/or
0 to 13% of CaO and/or
0 to 5% of BaO and/or
0 to 2% of $As_2O_3$.

In accordance with the present invention, a glass which exhibits a low thermal expansion and, further, a low-temperature melting property as a more preferred characteristic is able to be provided. Thus, it is now possible to provide a glass where an average linear thermal expansion coefficient at 0° C. to 50° c. is preferably not more than $40\times10^{-7\circ}$ $C.^{-1}$, more preferably not more than $35\times10^{-7\circ}$ $C.^{-1}$ and, most preferably, not more than $33\times10^{-7\circ}$ $C.^{-1}$ which is able to be manufactured from a glass material where its melting temperature is preferably not higher than 1550° C., more preferably not higher than 1540° C. and, most preferably, not higher than 1530° C. as a more preferred characteristic.

The glass of the present invention is suitable as various kinds of substrate materials, structure materials, materials of a transmission optical system, etc. where a thermal dimensional stability and thermal resistance are required.

DETAILED DESCRIPTION OF THE PREFERRED EMBODIMENTS

An average linear thermal expansion coefficient of the glass of the present invention is preferably not more than $40\times10^{-7\circ}$ $C.^{1}$, more preferably not more than $35\times10^{-7\circ}$ $C.^{-1}$ and, most preferably, not more than $33\times10^{-7\circ}$ $C.^{-1}$ at 0° C. to 50° C. whereby the glass is able to be preferably applied to various kinds of substrate materials, structure materials, materials of a transmission optical system, etc. where a thermal dimensional stability and thermal resistance are required.

Now, each of the components which constitute the glass of the present invention will be illustrated. The each component as such is expressed in terms of % by mass on the basis of an oxide.

Here, the term "on the basis of an oxide" means a method for expressing the composition of each component contained in the glass with an assumption that all of oxides, nitrates, etc. used as materials for the constituting components of the glass of the present invention are decomposed upon melting to oxides and the amount of each component contained in the glass is expressed where total amount of the mass of the resulting oxides is defined as 100% by mass.

The glass of the present invention is characterized in that it contains an $Al_2O_3$ component and a $B_2O_3$ component on the basis of oxides and the ratio of $B_2O_3/Al_2O_3$ in terms of % by mass is not less than 0.8.

The $Al_2O_3$ and the $B_2O_3$ are the components for glass network former of the present invention. The $Al_2O_3$ component has an effect of increasing the thermal resistance and also of suppressing the phase separation of the glass while the $B_2O_3$ component has an effect of lowering the viscosity at high temperature region and of improving a low-temperature melting property (being able to be melted at lower temperature).

When the above ratio of $B_2O_3/Al_2O_3$ is made not less than 0.8, it is now possible to give a glass where an average linear thermal expansion coefficient at 0 to 50° C. is not higher than $40 \times 10^{-7}$ °C.$^{-1}$ while a low fusing temperature is still able to be maintained.

For an object that far lower average linear thermal expansion coefficient and far lower melting temperature are to be made more easily available, the ratio of $B_2O_3/Al_2O_3$ is preferably not less than 0.9 and, most preferably, not less than 0.95.

When the content of the above $B_2O_3$ component is less than 10%, melting of the glass material is apt to become difficult and, therefore, the lower limit of the content of the $B_2O_3$ component is to be made preferably not less than 10%, more preferably not less than 13% and, most preferably, not less than 15%.

When the content of the above $B_2O_3$ component is more than 30%, the thermal resistance of the glass is apt to become low and also the average linear thermal expansion coefficient is apt to become high and, therefore, the upper limit of the content of the $B_2O_3$ component is to be made preferably not more than 30%, more preferably not more than 25% and, most preferably, not more than 22%.

When the content of the above $Al_2O_3$ component is less than 12.5%, the glass is apt to cause a phase separation and, therefore, the lower limit of the content of the above $Al_2O_3$ component is to be made preferably not less than 12.5%, more preferably not less than 14% and, most preferably, not less than 16%.

When the content of the above $Al_2O_3$ component is more than 25%, melting temperature of the glass is apt to become high and a low-temperature melting property is apt to significantly lower (a melting temperature becomes much higher) and, therefore, the upper limit of the content of the $Al_2O_3$ component is to be made preferably not more than 25%, more preferably not more than 23% and, most particularly not more than 20%.

A $SiO_2$ is a component which is able to be glass network former of the glass of the present invention and, as a result of containing this component, the glass of the present invention is apt to be able to achieve a further lower average linear thermal expansion coefficient.

For an object that the further lower average linear thermal expansion coefficient and the further lower melting temperature are apt to be achieved, the ratio of $SiO_2/Al_2O_3$ in terms of % by mass is to be made preferably not more than 3.2, more preferably not more than 3.18 and, most preferably, not more than 3.15.

For an object that a desired average linear thermal expansion coefficient is able to be achieved more easily, the lower limit of the content of the $SiO_2$ component is to be made preferably not less than 40%, more preferably not less than 42% and, most preferably, not less than 44%.

Moreover, for an object that the melting temperature and the low-temperature melting property of the glass of the present invention it to be made further lower and further better, respectively, the upper limit of the content of the $SiO_2$ component is to be made preferably not more than 64%, more preferably not more than 60% and, most preferably, not more than 58%.

A ZnO is an optional component which makes an improvement in low-temperature melting property easier and makes an improvement in acid resistance easier. However, when its amount is more than 10%, an average linear thermal expansion coefficient is apt to become high and a tendency of devitrification is also apt to increase and, therefore, its content is to be made preferably not more than 10%, more preferably not more than 9% and, most preferably, not more than 8%.

Addition of an alkali earth metal oxide component improves the low-temperature melting property although there is a tendency that, as the adding amount increases, its average linear thermal expansion coefficient rises. However, as compared with other alkali earth metal oxides, a rise in an average linear thermal expansion by addition of the ZnO component is small.

Accordingly, for such an object that a low thermal expansion is to be made easy to maintain while a low-temperature melting property of the glass of the present invention is still improved, it is preferred that the ZnO component is added. The lower limit of its content is to be made preferably not less than 1% and, most preferably, not less than 3%.

A $TiO_2$ is a component which is able to be optionally added so that chemical resistance of the glass is apt to be improved. However, when its content becomes large, the low-temperature melting property is apt to become low and, in addition, tendency of devitrification is apt to become high whereby the upper limit of the content is to be made preferably not more than 10%, more preferably not more than 5% and, most preferably, not more than 2%.

The CaO is a component which is able to be optionally added so that the low-temperature melting property is improved and a tendency of devitrification is apt to be suppressed. However, when its content becomes large, the acid resistance is apt to become low and, in addition, the average linear thermal expansion coefficient is apt to become high whereby the upper limit of the content is to be made preferably not more than 10%, more preferably not more than 5% and, most preferably, not more than 2%.

The BaO is a component which is able to be optionally added so that a phase separation of the glass is apt to be suppressed and, moreover, a low-temperature melting property is apt to be improved. However, when its content becomes large, the average linear thermal expansion coefficient is apt to become high whereby the upper limit of the content is to be made preferably not more than 10%, more preferably not more than 5% and, most preferably, not more than 2%.

The $As_2O_3$ is a component which is able to be optionally added as a clarifying agent for the glass. However, even if too much amount is added, the clarifying effect does not become high whereby the upper limit thereof is to be made not more than 3%, preferably not more than 2% and, most preferably, not more than 1%.

The $ZrO_2$ component has an effect of improving the chemical durability but, since the melting temperature becomes high, it is not preferred to be contained in the glass of the present invention.

MgO is expected to improve the viscosity and the devitrification of the glass of the present invention but, since the average linear thermal expansion coefficient is apt to become high and, in addition, the acid resistance of the glass is apt to become low, it is not preferred to be contained in the glass of the present invention.

With regard to a PbO component, it is necessary to carry out a step in view of environment measure in manufacturing, processing and discarding the glass and the cost therefore is required and, therefore, the PbO should not be contained in the glass of the present invention.

Further, in the glass of the present invention, oxide components of V, Cr, Mn, Fe, Co, Ni, Mo, Eu, Nd, Sm, Tb, Dy, Er, etc. rarely contribute in the object of the present invention and rather color the glass. Therefore, when the use as materials of transmission optical system is taken into consideration, they are preferred not to be contained.

Here, the term reading "not to be contained" means the case where they are not artificially contained excluding the case where they are contaminated as impurities.

Other components may be added so far as they do not deteriorate the gist of the present invention although it is preferred that no alkali metal oxide component is contained since it is apt to make the average linear thermal expansion coefficient of the glass high.

Further, in order to make the availability of low average linear thermal expansion coefficient easier, each component other than the components of $SiO_2$, $Al_2O_3$ and $B_2O_3$ contained in the glass does not exceed 15% in terms of % by mass on the basis of an oxide.

A known melting method may be used as a method for manufacturing the glass of the present invention. Thus, a glass material comprising silica sand, boric acid, aluminum hydroxide, zinc white, titanium oxide, calcium carbonate, barium nitrate, arsenious acid, etc. is charged in a crucible comprising quartz, platinum or the like so that the glass of the present invention becomes a composition represented on the basis of the oxides. It is then heated to melt using a furnace such as an electric furnace or a gas furnace. Most of the glass of the present invention shows a melting temperature of the glass material at not higher than 1550° C. Temperature upon heating/melting using the above furnace is 1450° C. to 1550° C. and, in a preferred embodiment, melting is done at the temperature of 1400° C. to 1500° C.

After the melting, the glass is homogenized by means of clarification and stirring if necessary and, after that, the melted glass is flown into a mold, quickly cooled to mold and then slowly cooled in an annealing furnace.

The glass which is taken out from an annealing furnace is subjected to cutting, grinding and polishing if necessary whereupon various kinds of substrate materials, structure materials and materials of a transmission optical type are able to be prepared.

EXAMPLES

Examples of the present invention will now be illustrated. There was prepared a glass material batch comprising silica sand, boric acid, aluminum hydroxide, zinc white, titanium oxide, calcium carbonate, barium nitrate and arsenious acid so that the glass gave the composition ratio shown in Table 1 represented on the basis of oxides. The batch was charged in a platinum crucible and heated to melt for 6 hours using an electric furnace of 1450° C. to 1500° C. The melted glass was molded into plates and slowly cooled.

An average linear thermal expansion coefficient was measured in such a manner that the glass plate prepared hereinabove was made into a sample of 3 mm diameter and 25 mm length followed by subjecting to a measurement by a low-temperature dilatometer manufactured by Mack Science.

Table 1 shows the glass compositions represented by % by mass on the basis of oxides manufactured by the Examples of the present invention together with melting temperatures and average linear thermal expansion coefficients at 0 to 50° C.

TABLE 1

| Components (% by mass) | Examples | | | | | |
| --- | --- | --- | --- | --- | --- | --- |
| | 1 | 2 | 3 | 4 | 5 | 6 |
| $SiO_2$ | 50.2 | 44.1 | 55.2 | 56.0 | 56.0 | 56.0 |
| $B_2O_3$ | 19.3 | 29.1 | 17.4 | 17.6 | 17.6 | 17.6 |
| $Al_2O_3$ | 20.0 | 17.5 | 18.0 | 18.3 | 18.3 | 18.3 |
| $TiO_2$ | 1.6 | 1.4 | 1.4 | — | 1.4 | 1.4 |
| ZnO | 4.7 | 4.1 | 4.2 | 4.3 | 4.3 | 4.3 |
| CaO | 1.6 | 1.4 | 1.4 | 1.4 | — | 1.4 |
| BaO | 1.6 | 1.4 | 1.4 | 1.4 | 1.4 | — |
| $As_2O_3$ | 1.0 | 1.0 | 1.0 | 1.0 | 1.0 | 1.0 |
| Total | 100.0 | 100.0 | 100.0 | 100.0 | 100.0 | 100.0 |
| $SiO_2/Al_2O_3$ | 2.5 | 2.5 | 3.1 | 3.1 | 3.1 | 3.1 |
| $B_2O_3/Al_2O_3$ | 1.0 | 1.7 | 1.0 | 1.0 | 1.0 | 1.0 |
| Fusing Temp (° C.) | 1480 | 1450 | 1450 | 1500 | 1500 | 1500 |
| Average Coefficient of Linear Expansion (0 to 50° C.) (x $10^{-7}$ ° $C.^{-1}$) | 26.5 | 32.0 | 24.6 | 26.2 | 24.9 | 25.8 |

In all of the glass products in the above Examples, the average linear thermal expansion coefficient at 0° C. to 50° C. is not more than $32 \times 10^{-7}$ ° $C.^{-1}$ and the melting temperature is not higher than 1500° C. The glass of Example 3 is very good in both terms of a low thermal expansion and a low-temperature melting property where the average linear thermal expansion coefficient at 0° C. to 50° C. is $24.6 \times 10^{-7}$ ° $C.^{-1}$ and the melting temperature is not higher than 1450° C.

Further, all of the glass products in the above Examples contains no MgO component and has a good resistance to acids.

The glass as such was subjected to the processes such as cutting, grinding and polishing successively to prepare substrate materials, structure materials and transmission optical materials. All of them exhibited thermal dimensional stability and resistance to heat and, as compared with the conventional glass, ceramic materials, etc. having low expansion upon heating, they were able to be manufactured at low cost and processed easily.

What is claimed is:

1. Glass, in terms of % by mass on the basis of oxides, comprising:
40 to 64% of $SiO_2$,
10 to 30% of $B_2O_3$,
12.5 to 25% of $Al_2O_3$,
1 to 10% of ZnO,
1.4 to 10% of BaO,
wherein said glass contains no alkali metal oxide component,
an average linear thermal expansion coefficient at 0° C. to 50° C. is not more than $40 \times 10^{-7}$ °C.$^{-1}$, and
the ratio of $SiO_2/Al_2O_3$ in terms of % by mass is not more than 3.2, and
the ratio of $B_2O_3/Al_2O_3$ in terms of % by mass is not less than 0.8.

2. The glass according to claim 1, further comprising one or more selected from:
0 to 10% of $TiO_2$,
0 to 10% of CaO, and
0 to 3% of $As_2O_3$.

3. The glass according to claim 1, wherein any of the components other than a $SiO_2$ component, an $Al_2O_3$ component and a $B_2O_3$ contained in glass is not more than 15% in terms of % by mass on the basis of oxides.

4. The glass according to claim 1, wherein a melting temperature of a glass material is not higher than 1,550° C.

* * * * *